United States Patent
Nishizaki

(10) Patent No.: US 9,396,419 B2
(45) Date of Patent: Jul. 19, 2016

(54) DATA-PROCESSING APPARATUS GENERATING COLOR CONVERSION DATA

(71) Applicant: BROTHER KOGYO KABUSHIKI KAISHA, Nagoya, Aichi (JP)

(72) Inventor: Takashi Nishizaki, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/628,391

(22) Filed: Feb. 23, 2015

(65) Prior Publication Data

US 2015/0242724 A1 Aug. 27, 2015

(30) Foreign Application Priority Data

Feb. 26, 2014 (JP) .................................. 2014-035198

(51) Int. Cl.
| H04N 1/40 | (2006.01) |
| G06K 15/02 | (2006.01) |
| G06F 3/12 | (2006.01) |
| H04N 1/60 | (2006.01) |

(52) U.S. Cl.
CPC ............ *G06K 15/188* (2013.01); *G06F 3/1219* (2013.01); *G06K 15/1822* (2013.01); *H04N 1/605* (2013.01); *H04N 1/6008* (2013.01); *H04N 1/6033* (2013.01); *H04N 1/6058* (2013.01); *H04N 1/6075* (2013.01)

(58) Field of Classification Search
None
See application file for complete search history.

(56) References Cited

U.S. PATENT DOCUMENTS

| 7,206,100 | B2 * | 4/2007 | Namikata | ..................... 358/3.23 |
| 8,077,353 | B2 * | 12/2011 | Wada | .............................. 358/1.9 |
| 8,154,763 | B2 * | 4/2012 | Matsuo | .......................... 358/1.9 |
| 8,395,832 | B2 * | 3/2013 | Iwamoto | ....................... 358/518 |
| 2013/0271779 | A1 | 10/2013 | Suzuki | |

FOREIGN PATENT DOCUMENTS

| JP | 2009-124233 A | 6/2009 |
| JP | 2013-223053 A | 10/2013 |

* cited by examiner

*Primary Examiner* — Steven Kau

(74) *Attorney, Agent, or Firm* — Scully, Scott, Murphy & Presser, P.C.

(57) ABSTRACT

A data-processing apparatus modifies a part of a plurality of measurement values defined in a specified color space to acquire modified measurement values; and generates color conversion data by using the modified measurement values. A dark range is defined by lightness of a maximum chroma measurement value and includes a first color range and a second color range. The first color range includes at least a part of an outer layer corresponding to a target color range. The second color range is at least a part of a portion inside the first color range in the dark color range. The data-processing apparatus performs the modification to meet the following conditions (a) and (b): (a) lightness of each measurement value within the first color range is not increased; and (b) lightness of each measurement value within the second color range is increased.

13 Claims, 8 Drawing Sheets

DATA-PROCESSING APPARATUS GENERATING COLOR CONVERSION DATA

CROSS REFERENCE TO RELATED APPLICATION

This application claims priority from Japanese Patent Application No. 2014-035198 filed Feb. 26, 2014. The entire content of the priority application is incorporated herein by reference.

TECHNICAL FIELD

The present invention relates to a data processing apparatus for generating color conversion data that expresses correlations between two color spaces.

BACKGROUND

Printing has been conventionally performed using ink, toner, and other colorants. Some printing processes include color conversion for converting image data from its original color space (the RGB color space, for example) to the color space of the colorant used in printing (the CMYK color space, for example). Here, a technique was proposed for suppressing a reduction in the color gamut for low-lightness regions while limiting the total magnitude of color signals corresponding to the colorants used for printing (reducing the values of the color signals in order to reduce the amount of colorant used) by adjusting the color signal for black in addition to the color signals for cyan, magenta, and yellow.

SUMMARY

However, a method, which is different from the conventional technique, for reducing the usage amount of colorants and for suppressing and reduction of the color gamut in low-lightness regions has been desired.

In view of the foregoing, it is an object of the invention to provide a data-processing apparatus capable of reducing the amount of colorants used for printing while also suppressing a reduction in the color gamut that these colorants can render.

In order to attain the above and other objects, the invention provides a data-processing apparatus including a controller. The controller is configured to perform: modifying a part of a plurality of measurement values defined in a specified color space to acquire modified measurement values; and generating color conversion data by using the modified measurement values. The plurality of measurement values are in one-to-one correspondence with a plurality of color values defined in a first color space. The plurality of measurement values define a color range within which the plurality of measurement values are distributed in the specified color space. The color range has an outer layer and includes a target color range corresponding to at least a part of a plurality of hue ranges defined in the specified color space. The target color range includes a dark color range defined by lightness of a maximum chroma measurement value having a maximum chroma among measurement values included within the target color range. A measurement value within the dark color range has lightness value smaller than the lightness of the maximum chroma measurement value. The dark color range includes a first color range and a second color range. The first color range includes at least a part of the outer layer corresponding to the target color range. The second color range is at least a part of a portion inside the first color range. The modifying is performed to meet the following conditions (a) and (b): (a) lightness of each measurement value within the first color range is not increased; and (b) lightness of each measurement value within the second color range is increased. The color conversion data represents correlations between color values defined in the first color space and color values defined in a second color space. Each color value defined in the second color space represents an amount of colorant used for printing.

According to another aspect, the present invention provides a non-transitory computer readable storage medium storing a set of program instructions executed by a computer. The program instructions includes: modifying a part of a plurality of measurement values defined in a specified color space to acquire modified measurement values; and generating color conversion data by using the modified measurement values. The plurality of measurement values are in one-to-one correspondence with a plurality of color values defined in a first color space. The plurality of measurement values define a color range within which the plurality of measurement values are distributed in the specified color space. The color range has an outer layer and includes a target color range corresponding to at least a part of a plurality of hue ranges defined in the specified color space. The target color range includes a dark color range defined by lightness of a maximum chroma measurement value having a maximum chroma among measurement values included within the target color range. A measurement value within the dark color range has lightness value smaller than the lightness of the maximum chroma measurement value. The dark color range includes a first color range and a second color range. The first color range includes at least a part of the outer layer corresponding to the target color range. The second color range is at least a part of a portion inside the first color range. The modifying is performed to meet the following conditions (a) and (b): (a) lightness of each measurement value within the first color range is not increased; and (b) lightness of each measurement value within the second color range is increased. The color conversion data represents correlations between color values defined in the first color space and color values defined in a second color space. Each color value defined in the second color space represents an amount of colorant used for printing.

BRIEF DESCRIPTION OF THE DRAWINGS

The particular features and advantages of the invention as well as other objects will become apparent from the following description taken in connection with the accompanying drawings, in which.

DETAILED DESCRIPTION

A. First Embodiment

Figure 1:
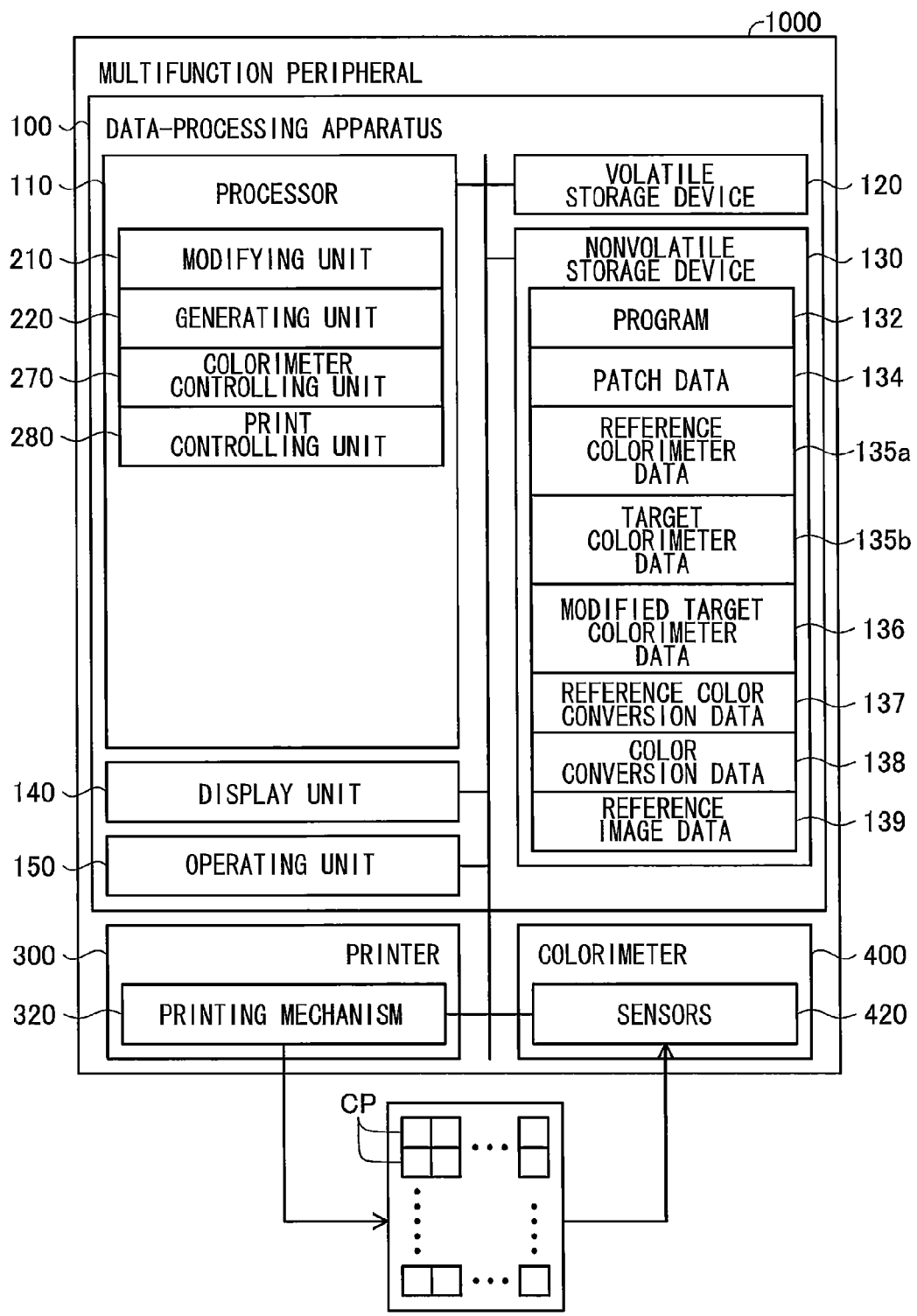
FIG. 1 is a block diagram showing a data-processing apparatus according to a first embodiment of the invention.

FIG. 1 is a block diagram showing a multifunction peripheral 1000 according to a first embodiment of the invention. The multifunction peripheral 1000 includes a data-processing apparatus 100 capable of processing data, a printer 300 that is connected to the data-processing apparatus 100, and a colorimeter 400 that is also connected to the data-processing apparatus 100.

The data-processing apparatus 100 includes a processor 110, a volatile storage device 120, a nonvolatile storage device 130, a display unit 140, and an operating unit 150.

The processor 110 is a central processing unit (CPU) for example, and is configured to process data. The volatile storage device 120 is DRAM, for example. The nonvolatile storage device 130 is flash memory, for example. The nonvolatile storage device 130 stores programs 132, patch data 134, reference colorimeter data 135a, target colorimeter data 135b, modified target colorimeter data 136, reference color conversion data 137, color conversion data 138, and reference image data 139.

The processor 110 executes the programs 132 to implement various functions and serves as a controller. In the first embodiment, the processor 110 implements the functions of several process units that include a modifying unit 210, a generating unit 220, a colorimeter controlling unit 270, and a print controlling unit 280. These process units will be described later in greater detail. The processor 110 also temporarily stores various intermediate data used when executing programs (the programs 132, for example) in a storage device (the volatile storage device 120 or nonvolatile storage device 130, for example). Other data stored in the nonvolatile storage device 130 will be described later in greater detail.

The display unit 140 is a liquid crystal display, for example, and is configured to display images. The operating unit 150 is a touchscreen placed over the display unit 140, for example, and is configured to receive input operations performed by the user. By operating the operating unit 150, the user can input various commands, including a start command for initiating a process to generate color conversion data.

The printer 300 is configured to print images on a printing medium (paper, for example). The printer 300 has a printing mechanism 320. In this embodiment, the printing mechanism 320 employs an inkjet system that uses the ink colors cyan (C), magenta (M), yellow (Y), and black (K). However, the printing mechanism 320 may employ another type of printing system, such as the electrophotographic system of a laser printer.

The colorimeter 400 is configured to measures colors and to output colorimeter data representing colorimetric values. The colorimeter 400 includes sensors 420. In this embodiment, the sensors are spectrophotometers, but sensors employing a different colorimetric method (photoelectric tristimulus colorimetry, for example) may be used as the sensors 420.

Figure 2:
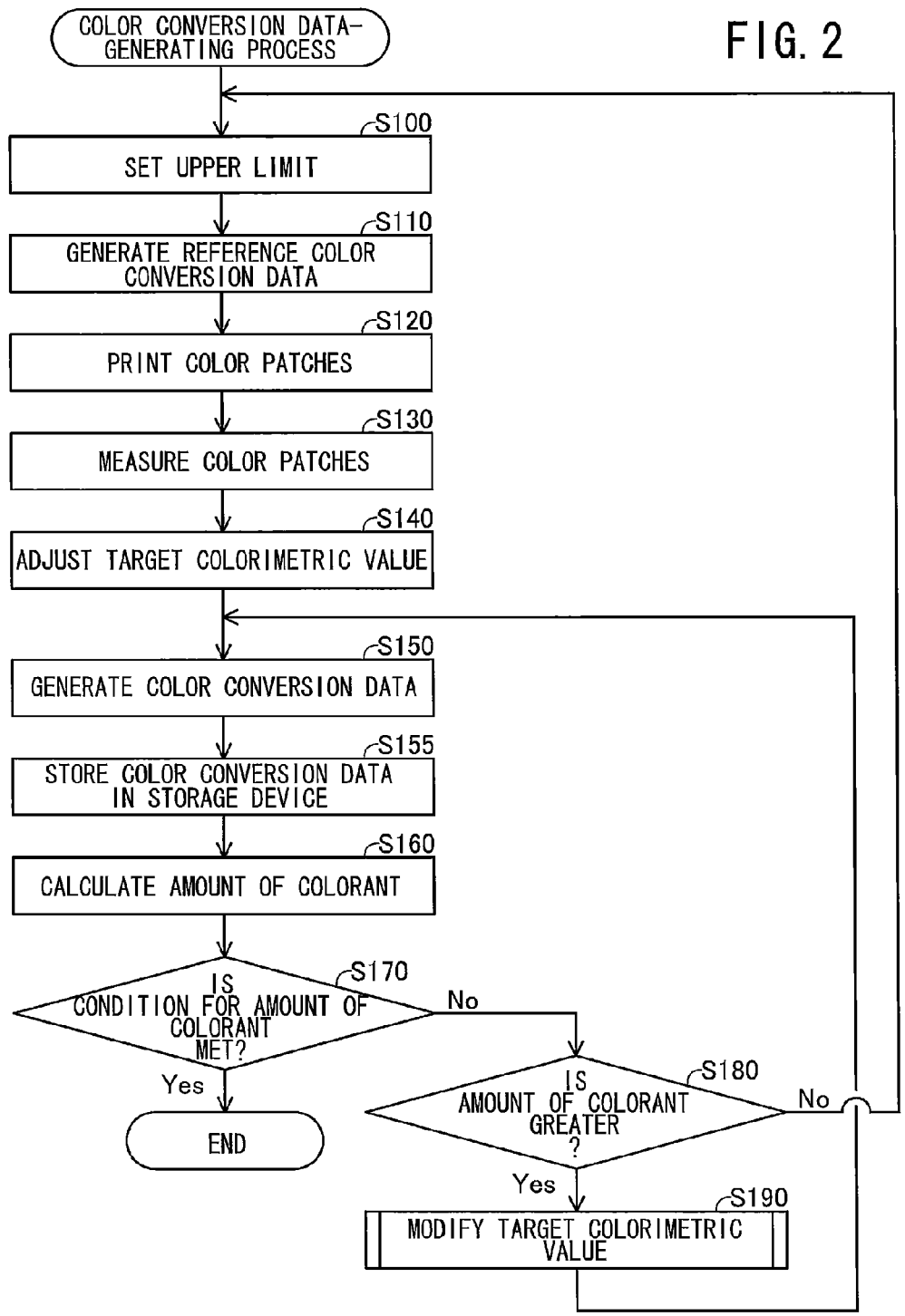
FIG. 2 is a flowchart illustrating steps in a color conversion data generating process executed by the data-processing apparatus.

FIG. 2 is a flowchart illustrating steps in a color conversion data-generating process for generating color conversion data. In this embodiment, the color conversion data-generating process involves controlling the printer 300 (see FIG. 1) to print color patches CP and controlling the colorimeter 400 to perform colorimetry on the color patches CP, setting correlations between color values indicating the amounts of colorants used in printing (CMYK color values, for example) and color values expressed in the color space representing the colorimetric values (L*a*b* color values, for example) based on the colorimetry results, and generating color conversion data based on the correlations. The color conversion data indicates correlations between color values of image data used for printing (red (R), green (G), blue (B) color values, for example) and color values indicating the amounts of colorants used in printing (CMYK color values, for example). Look-up tables may be used as the color conversion data, for example. In the following description, the color values of image data used for printing will be called "input color values," and the color space representing the input color values will be called the "first color space" (the RGB color space in the first embodiment). Similarly, color values representing the amounts of colorants used will be called "output color values," and the color space representing these output color values will be called the "second color space" (the CMYK color space in the first embodiment).

The processor 110 of the data-processing apparatus 100 begins the process for generating color conversion data when the data-processing apparatus 100 receives a command from the user to start the process. In this embodiment, the user can input a start command through operations on the operating unit 150.

In S100 at the beginning of the color conversion data-generating process, the generating unit 220 determines an upper limit for the output color values. An upper limit is set for the output color values to prevent an excess amount of colorants from being used in printing. Here, it is possible to set one upper limit for each of the plurality of color components in the second color space (an upper limit for each of the C, M, Y, and K colors, for example) or to set one upper limit for a combination of color components (an upper limit for C+M+Y, for example). When executing step S100 for the first time at the beginning of the process, the generating unit 220 employs a preset value for each color component as the upper limit of the color component (or combination of color components). Each time the generating unit 220 executes step S100 thereafter, the generating unit 220 updates the upper limits to larger values when the amounts of colorants used in printing based on the color conversion data generated in the color conversion data-generating process is less than a reference amount, as will be described later.

In S110 the generating unit 220 generates the reference color conversion data 137. The reference color conversion data 137 is color conversion data to be used as a reference. The generating unit 220 generates reference color conversion data 137 so that the output color values will not exceed their upper limits, and stores this reference color conversion data 137 in a storage device, such as the nonvolatile storage device 130. When executing step S110 for the first time at the beginning of the color conversion data-generating process, the generating unit 220 employs prescribed color conversion data as the reference color conversion data 137. For example, the prescribed color conversion data may be set so that the printed colors (i.e., colorimetric values) change more or less linearly in response to changes in color values in the first color space. However, color conversion data exhibiting other properties may also be used. In other words, the plurality of colorimetric values are in one-to-one correspondence with a plurality of color values in the first color space.

After updating upper limits to larger values in second and subsequent executions of step S100, the generating unit 220 also updates the reference color conversion data 137 in S110 so that the distribution range of output color values is widened to match the updated upper limit. For example, if the generating unit 220 updates the upper limit of the C component to a larger value, in S110 the generating unit 220 updates the reference color conversion data 137 by changing the value of the C component in the output color values to a larger value.

In S120 the print controlling unit 280 (see FIG. 1) generates print data using the patch data 134 and transmits this print data to the printer 300. The printing mechanism 320 of the printer 300 prints N color patches CP (where N is an integer of 2 or greater; see FIG. 1), each in a different color, based on the print data.

The patch data 134 is image data expressed in the first color space and represents the N color patches CP. For example, the patch data 134 may be RGB bitmap data representing the N color patches CP. The color of each pixel is expressed in R, G, and B color components. Each color component can be expressed in 256 gradations (0-255), for example. The RGB gradation values representing the color of each of the N color patches CP are selected from a plurality of prescribed gradation values. In the first embodiment, nine gradation values obtained by dividing the full range of gradation values into eight equal segments (0, 32, 64, 96, 128, 160, 192, 224, and 255) can be selected as gradation values of the RGB color components. In the first embodiment, since all possible combinations of the nine gradation values for the RGB color components are used for printing color patches CP, the total number N of color patches CP is 729 (9*9*9).

Figure 3:
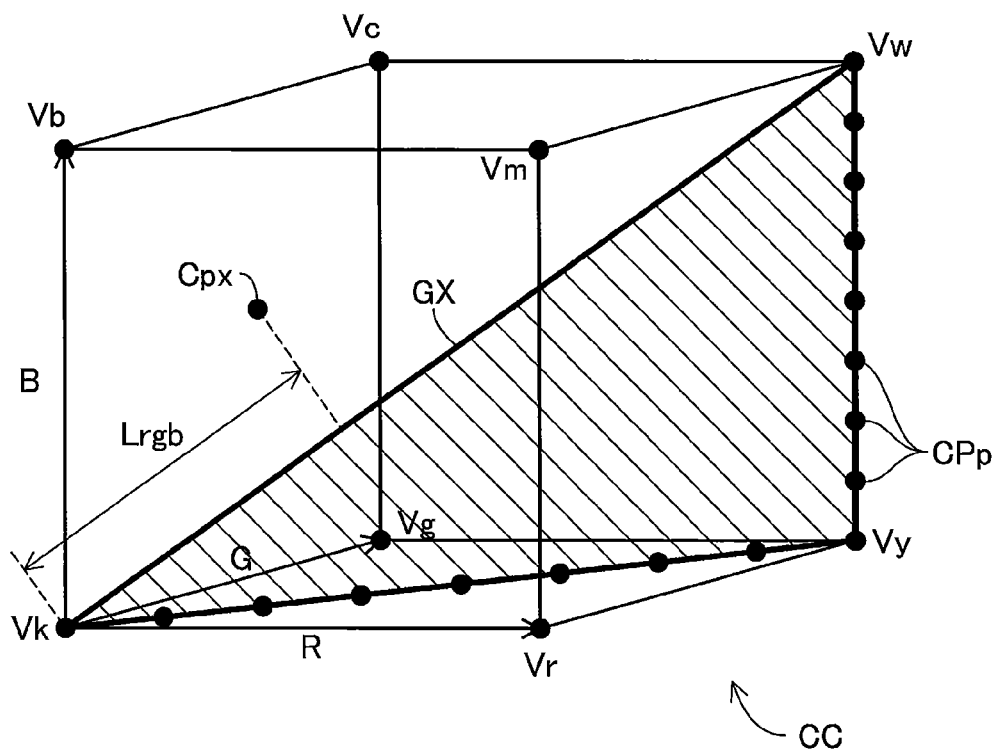
FIG. 3 is a schematic diagram of a color solid in a first color space and indicates color values of color patches.

FIG. 3 is a schematic diagram of a color solid CC expressed in RGB gradation values and indicates the RGB color values of the color patches CP. Colors expressed in the RGB color space are represented as points in the color solid CC (called "color points"). Each of the eight vertices of the color solid CC in FIG. 3 is assigned a reference symbol indicating a color (specifically, a black vertex Vk, red vertex Vr, green vertex Vg, blue vertex Vb, cyan vertex Vc, magenta vertex Vm, yellow vertex Vy, and white vertex Vw). An axis GX in FIG. 3 is a line segment connecting the black vertex Vk to the white vertex Vw and represents achromatic colors (i.e., grays; hereinafter referred to as the gray axis GX). Color points CPp depicted as black dots in FIG. 3 denote color points for color patches CP printed in S120 of FIG. 2. Note that only some of the N color points CPp corresponding to the N color patches CP are indicated in FIG. 3. Although not indicated in the drawing, the N color points include the eight vertices of the color solid CC and form a grid of dots distributed at approximately equal intervals throughout the entire color solid CC.

In a plane of the color solid CC passing through the gray axis GX, the portion of the plane on one side of the gray axis GX represents colors of approximately the same hue. For example, the plane depicted by hatching in FIG. 3 is the portion of a plane in the color solid on the yellow vertex Vy side of the gray axis GX CC that includes the gray axis GX and yellow vertex Vy. This portion of the plane represents colors whose hue are the same yellow as the hue of the yellow vertex Vy. Hereinafter, a plane representing colors with the same hue will be called a "uniform hue plane." The direction in which the uniform hue plane expands from the gray axis GX, i.e., the angle of the plane centered on the gray axis GX may be used as the hue index. Further, a distance $L_{rgb}$ in FIG. 3 denotes the distance along the gray axis GX between the black vertex Vk and the intersecting point of a normal to the gray axis GX that passes through a color point Cpx. The greater the distance $L_{rgb}$ is, the greater the value (lightness) of the color point Cpx is. This distance $L_{rgb}$ can be used as the lightness index for the color point Cpx (hereinafter called the lightness $L_{rgb}$).

The print controlling unit 280 converts the RGB color values (i.e., gradation values for each of the RGB color components) in the patch data 134 to CMYK color values (i.e., gradation values for each of the CMYK color components) corresponding to the quantities of colorants that the printer 300 can use and executes a halftone process using these CMYK color values to generate print data representing the color patches CP. To convert RGB color values to CMYK color values, the print controlling unit 280 uses the reference color conversion data 137 generated in S110.

In S130 of FIG. 2, the colorimeter 400 (see FIG. 1) measures colorimetric values of the N color patches CP. In this embodiment, the colorimeter controlling unit 270 transmits a measurement command to the colorimeter 400, and the sensors 420 of the colorimeter 400 perform measurements in response to the command to acquire colorimetric values. The colorimetric values are expressed in a color space, such as the CIE L*a*b* color space, that is independent of devices like the printer 300. The sensors 420 transmit colorimetric data representing the colorimetric values to the data-processing apparatus 100, and the colorimeter controlling unit 270 receives this colorimetric data from the colorimeter 400.

Note that the printing mechanism 320 in the first embodiment includes a mechanism for moving the colorimeter 400 relative to the printing medium on which the color patches CP have been printed. The colorimeter controlling unit 270 controls this moving mechanism, automatically scanning the N color patches CP with the colorimeter 400. As an alternative, the user may scan the N color patches CP with the colorimeter 400 manually.

In S140 of FIG. 2, the generating unit 220 generates the target colorimeter data 135b by adjusting the reference colorimetric values in the reference colorimeter data 135a to conform to the N colorimetric values acquired in S130. The reference colorimeter data 135a represents N reference colorimetric values pre-correlated with the N color patches CP. The reference colorimetric values specify desired colors associated with the color patches CP (i.e., input color values). For example, the reference colorimetric value of a color patch CP on the gray axis GX in FIG. 3 falls on a line segment connecting two reference colorimetric values in the L*a*b* color space corresponding to the black vertex Vk and white vertex Vw. Thus, hue is substantially the same for the plurality of reference colorimetric values of the plurality of color patches CP that fall in the uniform hue plane of the color solid CC shown in FIG. 3. Further, the N reference colorimetric values are preset to maintain the chroma magnitude relationship and lightness magnitude relationship between the N RGB color values of the N color patches CP and the N reference colorimetric values. However, reference colorimeter data 135a exhibiting other characteristics may also be employed.

Note that the actual colorimetric values of the color patches CP may vary according to the type of printing medium and individual variability among printing mechanisms 320. As a result, the printer 300 may not be able to print colors that match the reference colorimetric values. Therefore, the generating unit 220 in this embodiment determines target colorimetric values by matching the reference colorimetric values to the actual colorimetric values. Any method may be used to set target colorimetric values based on the reference colorimetric values. For example, the generating unit 220 may employ a method of mapping a first color gamut in which the reference colorimetric values are distributed to a second color gamut in which the actual colorimetric values are distributed, and using colorimetric values mapped in the second color gamut for the reference colorimetric values as the target colorimetric values. Any of various methods may also be used for mapping the first color gamut to the second color gamut, such as the method called "gamut mapping."

For example, the generating unit 220 may employ the actual colorimetric values for white, black, and the color with the highest chroma among the plurality of hues represented by the plurality of color patches CP as the target colorimetric values of these color patches CP. Then the generating unit 220 determines the target colorimetric values of the other color patches CP by adjusting the reference colorimetric values of these patches to match how the target colorimetric values for the color patches CP mentioned above are adjusted from the reference colorimetric values to the actual colorimetric values.

Here, color values on the line segment connecting two target colorimetric values in the L*a*b* color space for the black vertex Vk and white vertex Vw are used as the target colorimetric values correlated to color values on the gray axis GX in the color solid CC of FIG. 3. Further, a plurality of target colorimetric values having the same hue are used as target colorimetric values correlated with a plurality of color values in a uniform hue plane in the color solid CC. Further, the N target colorimetric values are determined so as to retain the chroma magnitude relationship and lightness magnitude relationship between the N RGB color values of the N color patches CP and the N target colorimetric values. However, color values exhibiting different characteristics may also be employed as the target colorimetric values.

In S150 of FIG. 2, the generating unit 220 generates the color conversion data 138. First, the generating unit 220 generates output color data representing the correlations between output color values and colorimetric values using the colorimetric values acquired in S130. The output color data is a look-up table representing the plurality of combinations (i.e., correlations) of output color values and colorimetric values, for example. The generating unit 220 then identifies output color values for each color patch CP by first identifying the input color values of each color patch CP using the patch data 134 and then identifying the output color values corresponding to these input color values using the reference color conversion data 137. Next, the generating unit 220 generates the output color data using the output color values for each color patch CP and the colorimetric values for each color patch CP.

Next, the generating unit 220 identifies the output color values corresponding to the target colorimetric values of each color patch CP (hereinafter called the "target output color values") using this output color data. The generating unit 220 can calculate target output color values corresponding to arbitrary target colorimetric values through interpolation using the plurality of correlations between output color values and colorimetric values defined in the output color data, for example. Then the generating unit 220 generates the color conversion data 138 representing correlations between the input color values of each color patch CP and the target output color values of each color patch CP. In S155 the generating unit 220 stores the color conversion data 138 generated in S150 in a storage device such as the nonvolatile storage device 130.

In S160 of FIG. 2, the modifying unit 210 calculates the amounts of colorants used when printing a reference image represented by the reference image data 139 according to the color conversion data 138. The reference image data 139 is predetermined image data rendered in the first color space. The reference image data 139 is image data that represents various colors, such as RGB bitmap data representing a plurality of images (photos, illustrations, and color patches, for example). The modifying unit 210 calculates the output color values (CMYK color values in this case) from input color values in the reference image data 139 (RGB color values in this case) according to the color conversion data 138. The modifying unit 210 can calculate output color values corresponding to arbitrary input color values through interpolation using the plurality of correlations between input color values and output color values defined in the color conversion data 138, for example. In the embodiment, the total amount of all colorants that can be used in printing (the four CMYK colorants in this case) is used as the amount of colorants. The modifying unit 210 calculates this total amount (i.e., the amount of all colorants used) by adding output color values for all CMYK color components at all pixel positions in the reference image data 139. Note that the color conversion data 138 is generated based on unmodified target colorimetric values when the modifying unit 210 executes step S160 for the first time in the process of FIG. 2. Thus, the amount of colorants is calculated based on unmodified target colorimetric values at this time.

In S170 the modifying unit 210 determines whether the condition for the amount of colorants has been met. The condition for the amount of colorants is met when the usage amount of colorants calculated in S160 falls within a prescribed range (hereinafter called the target usage range). In this embodiment, the target usage range is no less than a prescribed lower limit and no greater than a prescribed upper limit and represents the preferred range for the total usage of colorants. The upper limit and lower limit of the target usage range are set to indicate that too much colorant is used in a printing process according to the color conversion data 138 when the total usage of colorants exceeds the upper limit, while an image printed in a printing process according to the color conversion data 138 will be too light when the total usage of colorants is less than the lower limit.

If the total usage of colorants falls within the target usage range (S170: YES), the modifying unit 210 ends the process of FIG. 2. Thereafter, the print controlling unit 280 performs printing operations by referencing the color conversion data 138 stored in the nonvolatile storage device 130. Specifically, the print controlling unit 280 generates print data using image data expressed in the RGB color space and supplies this print data to the printer 300. To generate the print data, the print controlling unit 280 converts the RGB color values to CMYK color values based on the color conversion data 138 and executes a halftone process on the resulting CMYK color values. The print controlling unit 280 can calculate output color values corresponding to any input color values through interpolation on a plurality of correlations between input color values (RGB color values) and output color values (CMYK color values) established in the color conversion data 138.

However, when the total usage of colorants falls outside the target usage range (S170: NO), in S180 the modifying unit 210 determines whether the total usage of colorants is greater than the upper limit of the target usage range. In other words, the modifying unit 210 determines whether or not the mount of colorant used for printing should be reduced. When the total usage of colorants is greater than the upper limit (S180:

YES), in S190 the modifying unit 210 generates the modified colorimeter data 136 by modifying the target colorimeter data 135b.

Figure 4:
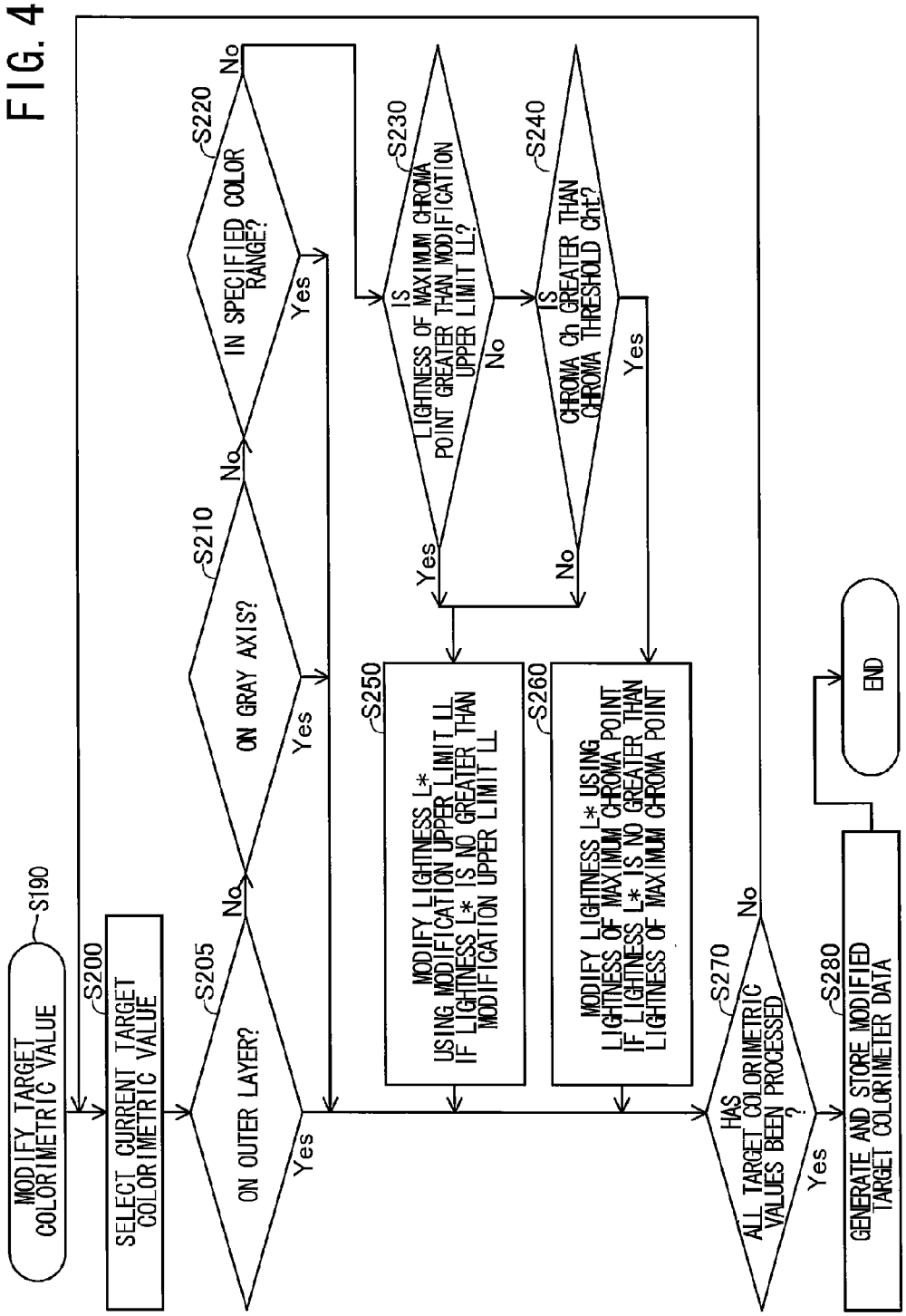
FIG. 4 is a flowchart illustrating steps in a process to modify target colorimetric values in the color conversion data generating process.

FIG. 4 is a flowchart showing steps in the process to modify target colorimetric values executed in S190 of FIG. 2. By performing the process in FIG. 4, the modifying unit 210 modifies those values among the N target colorimetric values that do not meet conditions described later.

In S200 at the beginning of the process to modify colorimetric values, the modifying unit 210 selects one of the N target colorimetric values that has not yet been processed as the current target colorimetric value (hereinafter simply called the "current color value").

Next, the modifying unit 210 determines whether the current color value is a target for modification according to the following three conditions C1-C3.

First condition C1: the current color value is on the outer layer of the distribution region for the N target colorimetric values Second condition C2: the current color value is on the gray axis Third condition C3: the current color value falls in a specific color range The modifying unit 210 respectively determines in steps S205, S210, and S220 of FIG. 4 whether the three conditions C1-C3 are satisfied. When the current color value satisfies at least one of the three conditions C1-C3, the modifying unit 210 determines that the current color value is not a target for modification. Thus, the modifying unit 210 only modifies the current color value if the current color value is not on the outer layer, is not on the gray axis, and is not in the specific color range.

Specifically, in S205 the modifying unit 210 determines whether the current color value is a color value on the outer layer of the distribution region for the N target colorimetric values (i.e., whether the first condition C1 is satisfied). The distribution region serves as an example of a color range. In this embodiment, the target colorimeter data 135b is set such that the chroma magnitude relationship and lightness magnitude relationship between the RGB color space and L*a*b* color space are not reversed. Consequently, the outer layer of the color solid CC (see FIG. 3) is correlated with the outer layer of the distribution range for the target colorimetric values within the L*a*b* color space. Hence, the modifying unit 210 determines that the current color value is a value on the outer layer when the current color value is correlated with a color value on the outer layer of the color solid CC. Note that the outer layer of the color solid CC is configured of six surfaces, including three surfaces in which at least one of the RGB values is zero, and three surfaces in which at least one of the RGB values is its maximum value (255 in the embodiment).

If the current color value is not a color value on the outer layer (S205: NO), in S210 the modifying unit 210 determines whether the current color value is a value on the gray axis (i.e., if the second condition C2 is satisfied). As described above, the target colorimetric value for any color value on the gray axis GX of the color solid CC falls on a line segment connecting target colorimetric values for the black vertex Vk and white vertex Vw in this embodiment. Therefore, the modifying unit 210 determines that the current color value is a color value on the gray axis when the current color value is correlated with a color value on the gray axis GX of the color solid CC.

If the current color value is not a color value on the gray axis (S210: NO), in S220 the modifying unit 210 determines whether the current color value falls in the specific color range (i.e., whether the third condition C3 is satisfied). In this embodiment, a prescribed range of flesh tones is used as the specific color range because areas of an image with flesh tones can greatly impact the quality of portraits or images of people (e.g., the appearance or visual impression, for example). Therefore, it is preferable to retain the original colors in areas of flesh tones, without changing the target colorimetric values (and more specifically, the value for lightness). Note that the specific color range is not limited to a range of flesh tones, but may be any type of color range (a range of blue tones depicting a sky, for example).

If at least one of the three conditions C1, C2, and C3 is satisfied (S205: YES, S210: YES, or S220: YES), the modifying unit 210 advances to S270 without modifying the current color value. In S270 the modifying unit 210 determines whether the above process has been completed for all target colorimetric values. If there remain any unprocessed target colorimetric values (S270: NO), the modifying unit 210 returns to S200 and repeats the process for another unprocessed target colorimetric value.

If none of the three conditions C1, C2, and C3 are satisfied (S205: NO, S210: NO, and S220: NO), the modifying unit 210 executes the processes in S230-S260 for modifying the current color value.

In S230 the modifying unit 210 determines whether the lightness of a color point having the largest (maximum) chroma is greater than a prescribed modification upper limit LL. Here, the lightness of a color point at maximum chroma is the lightness L* of the target colorimetric value at maximum chroma among target colorimetric values having the same hue as the current color value. The lightness of color point having the largest (maximum) chroma serves as an example of a maximum chroma measurement value.

Figure 5:
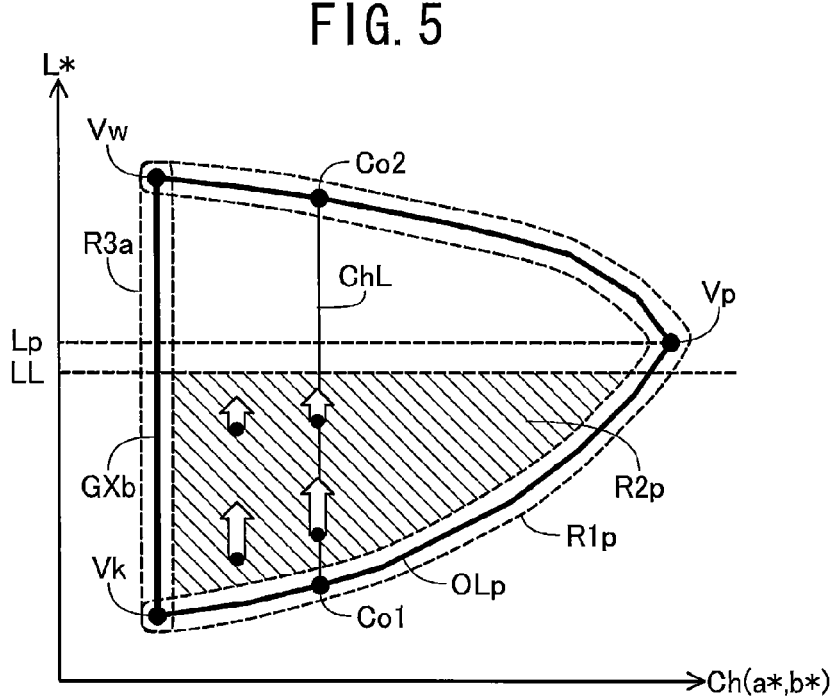
FIG. 5 is an explanatory diagram showing an example of one uniform hue plane in a specified color space.

FIG. 5 is an explanatory diagram showing an example of one uniform hue plane in the L*a*b* color space, where the horizontal axis represents chroma Ch and the vertical axis represents lightness L*. The lightness L* denotes the value of L* in the L*a*b* color space. The chroma Ch is the chroma expressed by the a* and b* values in the L*a*b* color space. In this embodiment, the chroma Ch is calculated by taking the square root of the sum of the square of a* and the square of b*.

Bold lines are used in FIG. 5 to depict an outer layer OLp of the region in which target colorimetric values are distributed, and a gray axis GXb. While not shown in the drawing, a plurality of target colorimetric values is distributed on the outer layer OLp, on the gray axis GXb, and in the region surrounded by the outer layer OLp and gray axis GXb. In this way, the range of colors in the uniform hue plane is the range of colors having the same hue (hereinafter called the "uniform hue range"). Some of the target colorimetric values are denoted by black dots in the drawing. For example, the target colorimetric values corresponding to the black vertex Vk and white vertex Vw in FIG. 3 are indicated by the same reference numerals in FIG. 5. Further, a color point Vp denotes a target colorimetric value having the highest chroma Ch among the plurality of target colorimetric values provided in the uniform hue plane of FIG. 5 (hereinafter this will be called the "maximum chroma color value Vp"). The example in FIG. 5 shows a case in which the lightness L* of the maximum chroma color value Vp (hereinafter called the "lightness Lp of the maximum chroma color point") is greater than the modification upper limit LL.

FIG. 5 specifies three color ranges R1p, R2p, and R3a. The color range R3a is configured by the gray axis GXb and will be called the gray range R3a. The target colorimetric values in the gray range R3a are target colorimetric values on the gray axis GXb. The color range R1p is configured by the outer layer OLp and will be called the first color range R1p. Target colorimetric values in the first color range R1p are target colorimetric values on the outer layer OLp. The color range R2p constitutes the portion inside the first color range R1p in which the lightness L* is less than or equal to the modification upper limit LL (excluding the gray range R3a) and will be called the second color range R2p. The second color range R2p is depicted with hatching in the drawing. Here, the portion inside the first color range R1p is a portion in which the lightness L* is greater than that in the first color range R1p for color points having the approximate same chroma Ch and in which the chroma Ch is smaller than that in the first color range R1p for color points having the approximate same lightness L*. The lightness L* for a target colorimetric value in the second color range R2p is higher than the lightness L* for a target colorimetric value in the first color range R1p having the approximate same chroma Ch.

When the lightness Lp of the maximum chroma color point is greater than the modification upper limit LL as in the example of FIG. 5 (S230: YES), in S250 the modifying unit 210 modifies the lightness L* of the current color value using the modification upper limit LL if the lightness L* of the current color value is no greater than the modification upper limit LL. Using the example of FIG. 5, the modifying unit 210 modifies the lightness L* of the current color value when the current color value is in the second color range R2p.

Figure 6:
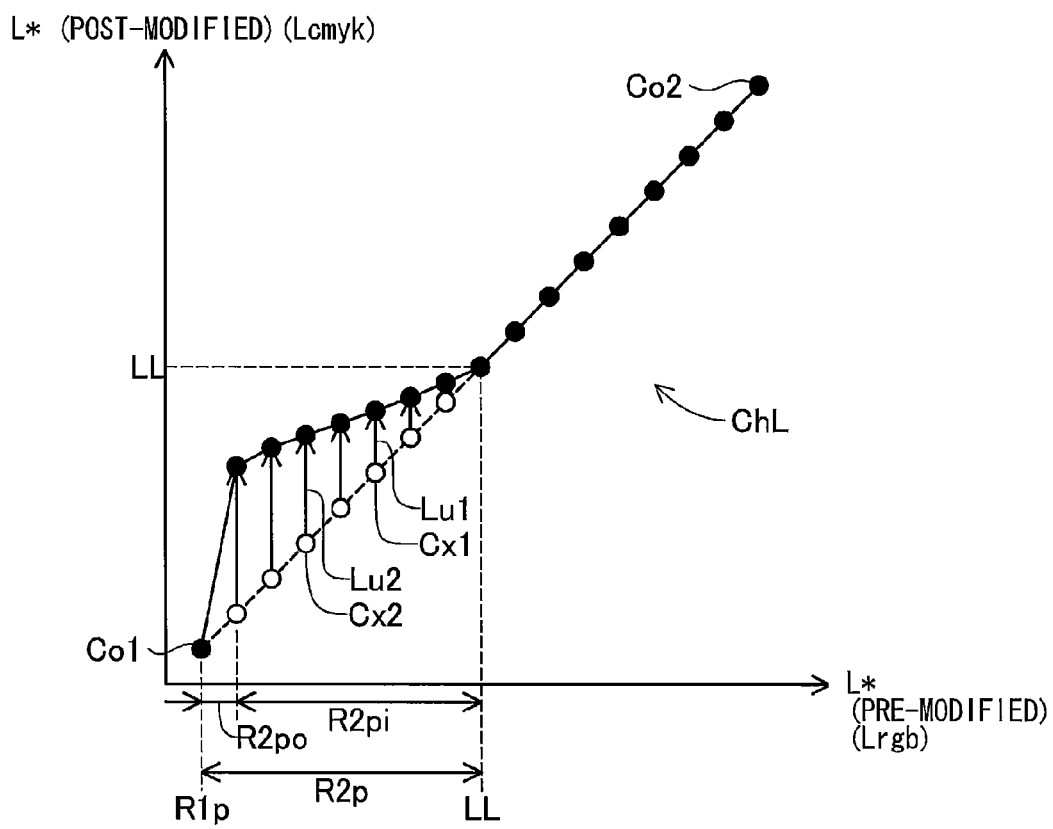
FIG. 6 is a graph showing correlations between lightness values before and after modification.

The graph in FIG. 6 shows correlations between the lightness L* before and after modification, where the horizontal axis represents the pre-modification lightness L* and the vertical axis the post-modification lightness L*. White dots denote pre-modification target colorimetric values, and black dots denote post-modification target colorimetric values. This graph shows correlations for lightness L* values along a uniform chroma line ChL shown in FIG. 5. The uniform chroma line ChL represents color values having the same chroma Ch and is parallel to the L* axis in FIG. 5. The uniform chroma line ChL intersects the outer layer OLp at two points. The intersecting point having the smaller lightness L* is designated as a first target colorimetric value Co1 in FIG. 5, and the intersecting point having the larger lightness L* is designated as a second target colorimetric value Co2. The target colorimetric values Co1 and Co2 fall in the first color range R1p.

As shown in FIG. 6, the modifying unit 210 does not modify the lightness L* when the lightness L* is greater than the modification upper limit LL. The modifying unit 210 also does not modify the lightness L* of the first target colorimetric value Co1 included in the first color range R1p. The modifying unit 210 modifies the lightness L* of target colorimetric values in the second color range R2p to a larger value. Further, the smaller the pre-modification lightness L* is, the larger the amount that the lightness L* is increased. However, the magnitude relationship of the lightness L* before and after modification is not reversed. In this way, the modifying unit 210 modifies the lightness L* based on the modification upper limit LL. Hereinafter, the lightness on which lightness modification is based will be called the "modification reference lightness."

In the first embodiment, the modifying unit 210 sets a larger increase in the lightness L* for a larger difference dL between the modification reference lightness (the modification upper limit LL in this case) and the pre-modification lightness L*. For example, the modifying unit 210 sets the increase according to the equation <increase =kc*dL>. Here, the operation symbol "*" is the multiplication symbol (the same shall apply hereafter). Further, the value kc is a coefficient and may be a predetermined value.

In S250 of FIG. 4, the modifying unit 210 modifies the lightness L* of each target colorimetric value in the second color range R2p of FIG. 5, as described in FIG. 6. White arrows in FIG. 5 indicate the change in the modified lightness L*. After performing this modification, the modifying unit 210 advances to S270.

When the lightness Lp of the maximum chroma color point is no greater than the modification upper limit LL (S230: NO), in S240 the modifying unit 210 determines whether the chroma Ch of the current color value is greater than a chroma threshold Cht.

Figure 7:
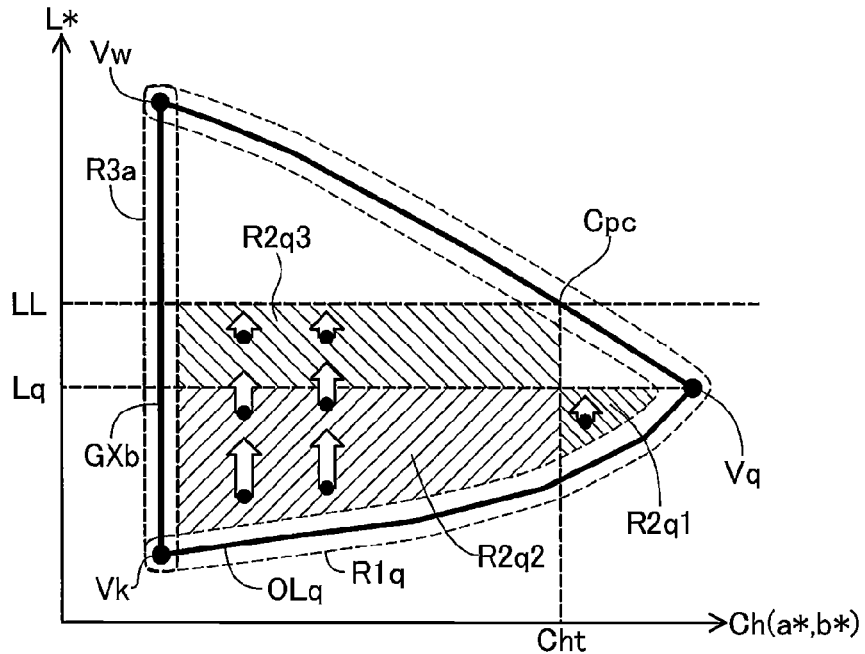
FIG. 7 is an explanatory diagram showing another example of one uniform hue plane in the specified color space.

FIG. 7 is an explanatory diagram showing an example of another uniform hue plane in the L*a*b* color space, where the horizontal axis denotes the chroma Ch and the vertical axis the lightness L*. The example in FIG. 7 differs from the example in FIG. 5 in that a lightness Lq of a maximum chroma color value Vq (hereinafter called the "lightness Lq of the maximum chroma color point") is smaller than the modification upper limit LL. The maximum chroma color value Vq is the target colorimetric value in the uniform hue plane of FIG. 7 having the highest chroma Ch.

Bold lines in FIG. 7 are used to depict an outer layer OLq of the region in which target colorimetric values are distributed, and the gray axis GXb. The black vertex Vk, white vertex Vw, and gray axis GXb in FIG. 7 are identical to those in FIG. 5 designated with the same reference symbols.

FIG. 7 also depicts five color ranges R3a, R1q, R2q1, R2q2, and R2q3. The gray range R3a is identical to the color range with the same reference numeral in FIG. 5. The first color range R1q is configured by the outer layer OLq. Target colorimetric values in the first color range R1q are values that fall on the outer layer OLq.

The three color ranges R2q1, R2q2, and R2q3 depicted with hatching in FIG. 7 denote color ranges whose target colorimetric values are subjected to modification. Hereinafter, each of the color ranges R2q1, R2q2, and R2q3 will be called a partial color range. The three partial color ranges R2q1, R2q2, and R2q3 are defined by the modification upper limit LL, the chroma threshold Cht, and the lightness Lq of the maximum chroma color point. The chroma threshold Cht is the chroma Ch of the color point Cpc among color points on the outer layer OLq whose lightness L* is equivalent to the modification upper limit LL. The first partial color range R2q1 is the partial color range inside the first color range R1p having a lightness L* no greater than the lightness Lq of the maximum chroma color point and a chroma Ch greater than the chroma threshold Cht. The second partial color range R2q2 is the partial color range inside the first color range R1p having a lightness L* no greater than the lightness Lq of the maximum chroma color point and a chroma Ch no greater than the chroma threshold Cht (excluding the gray range R3a). The third partial color range R2q3 is the partial color range inside the first color range R1p having a lightness L* exceeding the lightness Lq of the maximum chroma color point but no greater than the modification upper limit LL and a chroma Ch no greater than the chroma threshold Cht (excluding the gray range R3a).

When the modifying unit 210 determines in S240 of FIG. 4 that the chroma Ch of the current color value is no greater than the chroma threshold Cht (S240: NO), in S250 the modifying unit 210 modifies the lightness L* of the current color value using the modification upper limit LL when the lightness L* of the current color value is no greater than the modification upper limit LL. In the example of FIG. 7, the modifying unit 210 modifies the lightness L* of the current color value when the current color value falls in the second partial color range R2q2 or the third partial color range R2q3. The modifying unit 210 modifies the lightness L* as described in FIG. 6. After completing this modification, the modifying unit 210 advances to S270. The white arrows in FIG. 7 depict the change in lightness L* produced in these modifications.

When the chroma Ch of the current color value is greater than the chroma threshold Cht (S240: YES), in S260 the modifying unit 210 modifies the lightness L* of the current color value using the lightness Lq of the maximum chroma color point when the lightness L* of the current color value is no greater than the lightness Lq of the maximum chroma color point. In the example of FIG. 7, the modifying unit 210 modifies the lightness L* of the current color value when the current color value falls in the first partial color range R2$q$1.

The method of modifying the lightness L* in S260 is identical to the method described in S250 of FIG. 6 for modifying the modification reference lightness from the modification upper limit LL to the lightness Lq of the maximum chroma color point. That is, the modifying unit 210 does not modify the lightness L* when the lightness L* is greater than the lightness Lq of the maximum chroma color point, but modifies the lightness L* of target colorimetric values in the first partial color range R2$q$1 to larger values. Here, the increase in the lightness L* is greater for a smaller pre-modification lightness L*. However, the magnitude relationship of the lightness L* before and after modification is not reversed.

In the first embodiment, the modifying unit 210 uses a larger increase in the lightness L* for a larger difference dL between the modification reference lightness (the lightness Lq of the maximum chroma color point in this case) and the pre-modification lightness L*. For example, the modifying unit 210 sets the increase according to the equation <increase=kc*dL>. Here, kc is the coefficient kc described above. After completing the modification, the modifying unit 210 advances to S270.

Figure 8:
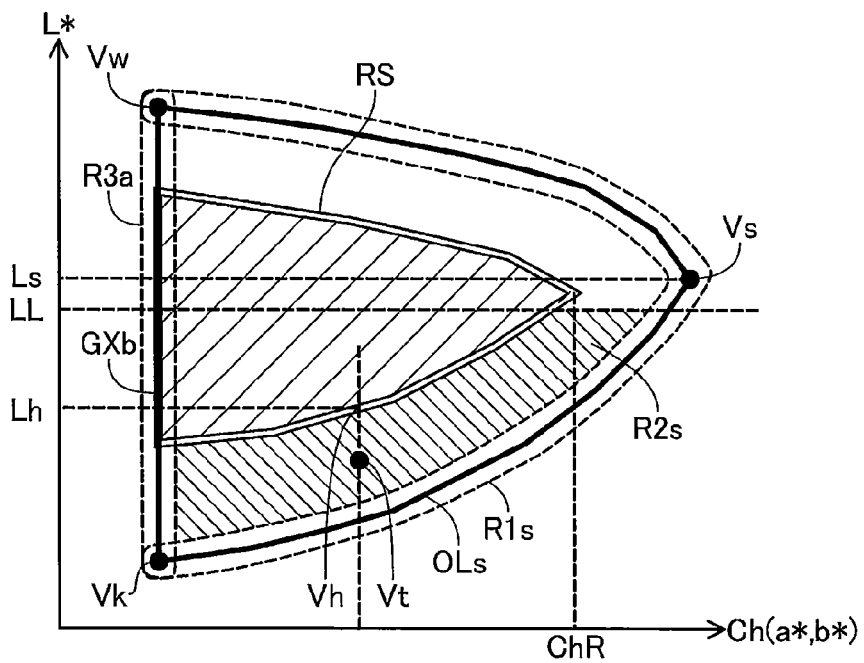
FIG. 8 is an explanatory diagram showing an example of one uniform hue plane including a specific color range in the specified color space.

FIG. 8 is an explanatory diagram showing an example of another uniform hue plane in the L*a*b* color space, where the horizontal axis denotes the chroma Ch and the vertical axis denotes the lightness L*. The example of FIG. 8 shows a case in which the uniform hue plane includes a specific color range (related to the third condition C3 determined in S220 of FIG. 4). A specific partial color range RS denotes a portion of the uniform hue plane included in this specific color range. Further, an outer layer OLs is the outer boundary of a region in which the target colorimetric values are distributed. The maximum hue color value Vs is the target colorimetric value in the uniform hue plane of FIG. 8 that has the highest chroma Ch. In the example of FIG. 8, lightness Ls of the maximum hue color value Vs is greater than the modification upper limit LL. The black vertex Vk, white vertex Vw, and gray axis GXb are identical to the same reference symbols in FIG. 8.

In addition to the specific partial color range RS, there are three color ranges R3$a$, R1$s$, and R2$s$ indicated in FIG. 8. The gray range R3$a$ is identical to the color range with the same reference numeral in FIG. 5. The first color range R1$s$ is configured by the outer layer OLs. Target colorimetric values in the first color range R1$s$ are values that fall on the outer layer OLs. The second color range R2$s$ is the remaining region inside the first color range R1$s$ having a lightness L* no greater than the modification upper limit LL after excluding the specific partial color range RS and the gray range R3$a$. The target colorimetric values in the second color range R2$s$ are the subject of modification.

When the uniform hue plane that includes the current color value has a specific partial color range RS such as that in FIG. 8 (i.e., the specific color range of the third condition C3), the modifying unit 210 modifies the lightness L* of the current color value in the second color range R2$s$ as follows. In S250 of FIG. 4, the modifying unit 210 identifies the maximum lightness for chroma of the current color value based on both the second color range R2$s$ and the current color value when the lightness L* of the current color value is no greater than the modification upper limit LL. FIG. 8 depicts a target colorimetric value Vt and a maximum lightness Lh as examples. The maximum lightness Lh is the lightness L* of a color value Vh having the largest lightness L* among colors in the second color range R2$s$ and a chroma Ch identical to that of the target colorimetric value Vt.

The modifying unit 210 modifies the lightness L* by using the smallest lightness among the maximum lightness and the modification upper limit LL as the modification reference lightness. When the maximum lightness is smaller than the modification upper limit LL, the modifying unit 210 modifies the lightness L* of the current color value using the maximum lightness as the modification reference lightness. In other words, the modifying unit 210 modifies the lightness L* to approach the maximum lightness. When the modification upper limit LL is less than or equal to the maximum lightness, the modifying unit 210 modifies the lightness L* of the current color value using the modification upper limit LL as the modification reference lightness. In other words, the modifying unit 210 modifies the lightness L* to approach the modification upper limit LL. Note that when the chroma Ch of the current color value is greater than a maximum chroma ChR within the specific partial color range RS, the modification upper limit LL is employed as the modification reference lightness.

The process described above is also performed when the uniform hue plane of FIG. 7 includes a specific color range (the third condition C3 used in the determination of S220). In this case, the subject of modification is the portion of the partial color ranges R2$q$1, R2$q$2, and R2$q$3 remaining after excluding the specific color range. When the chroma Ch of the current color value is no greater than the chroma threshold Cht, in S250 the modifying unit 210 modifies the lightness L* of the current color value as in the case of the second color range R2$s$ in FIG. 8. When the chroma Ch of the current color value is greater than the chroma threshold Cht, in S260 the modifying unit 210 modifies the lightness L* of the current color value using the smaller of the maximum lightness and the lightness Lq of the maximum chroma color point as the modification reference lightness. Here, the maximum lightness (not shown) is the lightness L* of a color having the largest lightness L* among colors in the first partial color range R2$q$1 remaining after excluding the specific color range whose chroma Ch is the same as the current color value.

As described above, the modifying unit 210 modifies the target colorimetric values. After completing the process for all target colorimetric values (S270: YES), in S280 the modifying unit 210 generates the modified colorimeter data 136 and stores the modified colorimeter data 136 in a storage device such as the nonvolatile storage device 130. The modified colorimeter data 136 represents N target colorimetric values including both modified and unmodified target colorimetric values. Subsequently, the modifying unit 210 ends the process of FIG. 4 and returns to S150 in FIG. 2. In S150 the generating unit 220 generates color conversion data using the modified colorimeter data 136.

Figure 9:
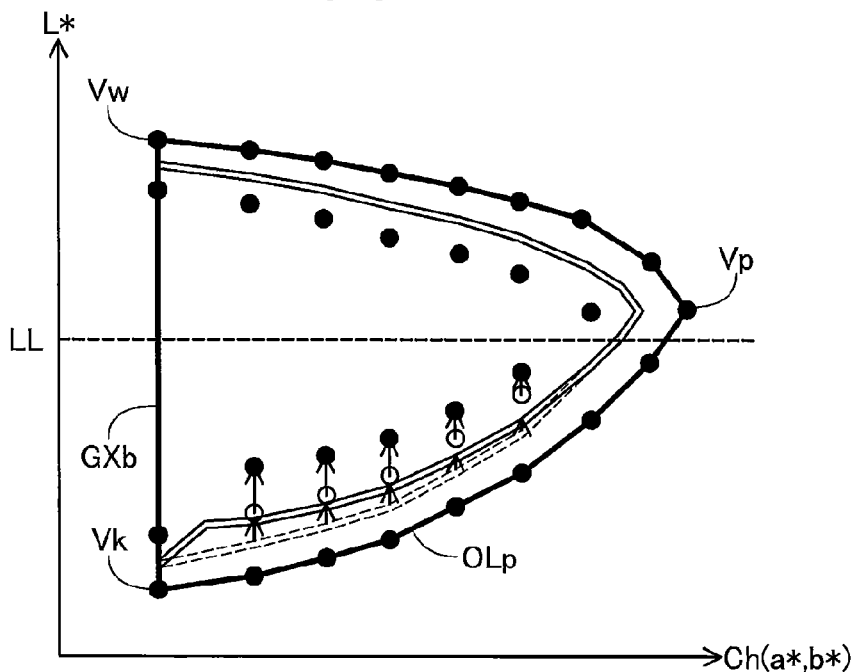
FIG. 9 is an explanatory diagram of colors printed according to color conversion data.

FIG. 9 is an explanatory diagram of colors printed according to the color conversion data 138. This drawing shows the same uniform hue plane as that in FIG. 5. The horizontal axis indicates the chroma Ch, and the vertical axis the lightness L*. Black dots in the drawing denote colorimetric values that can be produced from output color values obtained from the same input color values as the color patch CP through the color conversion data 138. The colorimetric values represented by these black dots are approximately the same as the target colorimetric values represented by the modified colorimeter data 136. White dots in the drawing depict colorimetric values that can be rendered when the target colorimetric values are not modified. Colorimetric values represented by white dots are approximately the same as the pre-modification target colorimetric values described in FIG. 5.

Double lines in FIG. 9 indicate colorimetric values that can be rendered when printing colors having input color values between the input color values of color patches CP on the outer layer OLp and the input color values of color patches CP one step inside the outer layer OLp. When printing such colors, the output color values are determined through interpolation using correlations between the input color values and output color values on the outer layer OLp and correlations between the input color values and output color values one step inside the outer layer OLp. The solid double lines denote colorimetric values that can be rendered when modifying the target colorimetric values, while the dashed double lines denote colorimetric values that can be rendered when not modifying the target colorimetric values. As can be seen from the drawing, the lightness L* of colors darker than the modification upper limit LL is made brighter by modifying the target colorimetric values, thereby reducing the amount of colorants used.

As described above, the target colorimetric values are not modified for color patches CP on the outer layer OLp. Hence, the outer layer of the color gamut in which target colorimetric values are distributed is maintained rather than being shrunk. Thus, the method of the embodiment avoids reducing the range of printable colors.

If the modifying unit 210 determines again in S170 and S180, after previously modifying the target colorimetric values in S190, that the total usage of colorants is greater than the upper limit of the target usage range, in S190 the modifying unit 210 modifies the target colorimetric values to even larger values. For example, the modifying unit 210 generates even larger modified target colorimetric values by adding a prescribed value to the coefficient kc described above to change the coefficient kc to a larger value.

When the total usage of colorants is smaller than the lower limit of the target usage range (S180: NO), the process returns to S100. At this time, the generating unit 220 updates the upper limit of output color values to a larger value (S100) and generates the reference color conversion data 137 to conform to the updated upper limit (S110). Then steps S120-S170 described above are performed based on the updated reference color conversion data 137.

Figure 10:
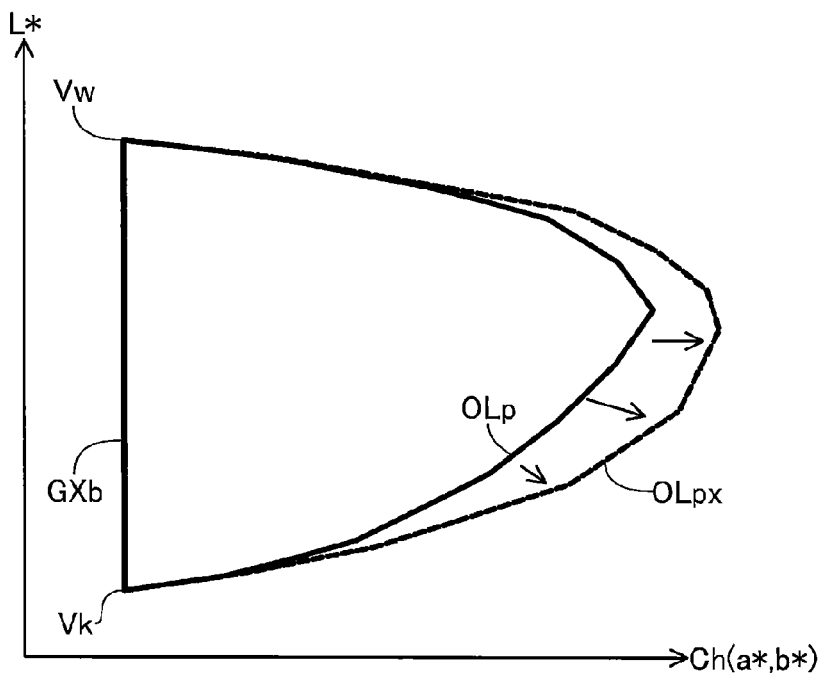
FIG. 10 is an explanatory diagram showing a change in a color gamut when an upper limit of output color values is updated.

FIG. 10 is an explanatory diagram showing a change in the color gamut when the upper limit of the output color values is updated. The uniform hue plane shown in FIG. 10 is the same plane depicted in FIG. 5. FIG. 10 shows two outer layers OLp and OLpx. The first outer layer OLp is the outer layer prior to updating the upper limit of the output color values and is identical to the outer layer OLp in FIG. 5. The second outer layer OLpx is the outer layer resulting from updating the upper limit of the output color values. In the example of FIG. 10, the color gamut is widened to include a higher range of chroma values, thereby increasing the total usage of colorants.

As described above, when the total usage of colorants is smaller than the lower limit of the target usage range (S170: NO, S180: NO), the generating unit 220 modifies the upper limit of the output color values to a larger value (S100). Further, when the total usage of colorants is greater than the upper limit of the target usage range (S170: NO, S180: YES), the modifying unit 210 modifies the lightness L* of target colorimetric values to larger values. Through this process, the generating unit 220 can generate color conversion data 138 that achieves suitable usage amounts of colorants.

Further, the modifying unit 210 executes the following process in a color range having the same hue within the specific color space representing the target colorimetric values (i.e., a uniform hue range). In other words, for a dark color range having colors darker than the maximum chroma color value (i.e., the target colorimetric value in the uniform hue range having the largest chroma), the modifying unit 210 does not increase the lightness of colorimetric values within the first color range that includes the outer layer defining the distribution range of the N target colorimetric values. Hence, the modifying unit 210 can avoid reducing the color gamut that can be rendered by the colorants. Here, the maximum chroma color value is the color value Vp, Vq, and Vs in the examples of FIGS. 5, 7, and 8, respectively. The dark color range is the color range that is darker than the lightness Lp, Lq, and Ls of the respective maximum chroma color points in FIGS. 5, 7, and 8. The outer layer in the examples of FIGS. 5, 7, and 8 is the outer layer OLp, OLq, and OLs, respectively. The first color range in the examples of FIGS. 5, 7, and 8 is the first color range R1$p$, R1$q$, and R1$s$, respectively.

Within the same dark color range, the modifying unit 210 increases the lightness of target colorimetric values within the second color range constituting at least part of the region inside the first color range. Hence, the modifying unit 210 can suppress an increase in the usage of colorants. Here, the second color range corresponds to the color range R2$p$ in FIG. 5, the color ranges R2$q$1 and R2$q$2 in FIG. 7, and the color range R2$s$ in FIG. 8.

As shown in FIG. 6, the ratio of change in the post-modification lightness L* to change in the pre-modification lightness L* is greater in a first part R2$po$ of the second color range R2$p$ than in a second part R2$pi$ of the second color range R2$p$. The first part R2$po$ borders the first color range R1$p$ from the first color range R1$p$. The second part R2$pi$ of the second color range R2$p$ is separated from the first color range R1$p$. That is, the second part R2$pi$ is the portion of the second color range R2$p$ that is lighter than the first part R2$po$ of the second color range R2$p$). Here, the correlations between RGB color values and target colorimetric values, i.e., correlations between the first color space and the specific color space representing the target colorimetric values are set so as to maintain the magnitude relationship of lightness, as described above. Hence, the pre-modification lightness L* is correlated with lightness in the first color space (the lightness $L_{rgb}$ in FIG. 3, for example). Hence, the relationship described above for FIG. 6 can be restated as follows. The ratio of change in the lightness L* within the specific color space (the L*a*b* color space, for example) to changes in the lightness $L_{rgb}$ within the first color space (the RGB color space, for example) will be simply called the "ratio of change in lightness." Within the second color range R2$p$, the ratio of change in lightness in the first part R2$po$ of the second color range R2$p$ adjacent to the first color range R1$p$ is greater than the ratio of change in lightness in the second part R2$pi$ of the second color range R2$p$ that is separated from the first color range R1$p$. The arrangement described above prevents the magnitude relationship from becoming reversed between the lightness $L_{rgb}$ in the first color space and the modified lightness L*. Thus, the process of the embodiment can suppress the printing of unnatural colors due to modifying the lightness L*. Further, the process of the embodiment suppresses an increase in the usage of colorants while avoiding a reduction in the color gamut that the colorants can render.

As shown in FIG. 6, the modifying unit 210 uses a smaller value as a first increase Lu1 for increasing the lightness L* of a first target colorimetric value Cx1 in the second color range R2p than a second increase Lu2 for increasing the lightness L* of a second target colorimetric value Cx2 that is darker than the first target colorimetric value Cx1. Hence, the modifying unit 210 can modify (and specifically, can increase) the lightness of target colorimetric values while maintaining the relationship of increases in lightness of target colorimetric values in response to increases in lightness of color values in the first color space (RGB color space, for example). As a result, the modifying unit 210 can prevent modifications of the target colorimetric values from causing unnatural changes in color.

Further, as a result of step S220 in FIG. 4, the modifying unit 210 does not modify target colorimetric values in the specific color range, but in the example of FIG. 8 uses the second color range R2s included in the remaining portion of the uniform hue range after excluding the portion that is included in the specific color range as the second color range R2s in which the lightness L* is to be modified. Hence, the modifying unit 210 can suppress an increase in the usage of colorants while suitably retaining colors in the specific color range.

As described with reference to FIGS. 4 and 7, the modifying unit 210 increases the lightness of target colorimetric values in a range of lightness no greater than the lightness Lq of the maximum chroma color point for the color range in the uniform hue range in which the chroma Ch exceeds the chroma threshold Cht, and increases the target colorimetric values in a range of lightness no greater than the modification upper limit LL brighter than the lightness Lq of the maximum chroma color point for the color range in the uniform hue range in which the chroma Ch is no greater than the chroma threshold Cht. Since the modifying unit 210 can widen the color range in which the lightness L* of target colorimetric values is increased, the modifying unit 210 can further reduce the amount of colorant used.

Note that it is possible to use an arbitrary value no greater than the lightness Lq of the maximum chroma color point as the modification reference lightness for the color range in which the chroma Ch exceeds the chroma threshold Cht (hereinafter called the "first lightness"). Further, it is possible to use an arbitrary value brighter than the first lightness as the modification reference lightness for the color range in which the chroma Ch is no greater than the chroma threshold Cht (hereinafter called the "second lightness"). Further, the first lightness may exceed the lightness Lq of the maximum chroma color point, and the second lightness may be equal to or less than the first lightness.

B. Second Embodiment

Figure 11:
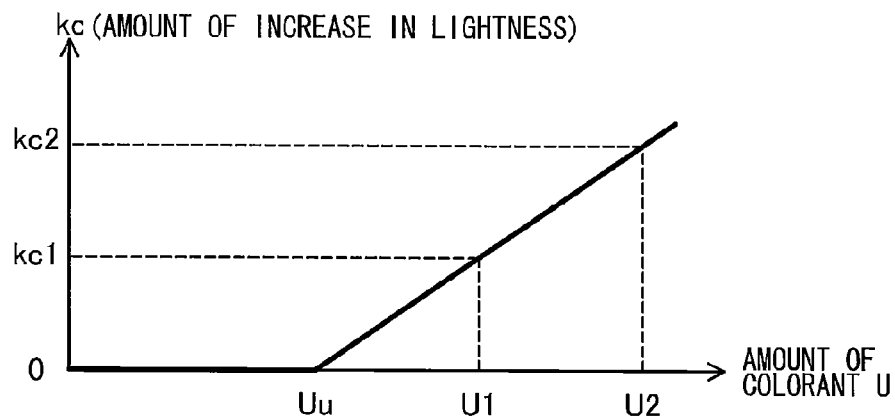
FIG. 11 is a graph showing an amount of increase in lightness values in a second embodiment of the invention.

FIG. 11 is a graph showing another example of increasing the lightness L* when modifying the same. The horizontal axis of the graph in FIG. 11 represents the amount of colorants to be used (hereinafter called the "target usage U") that the modifying unit 210 calculates when executing step S160 for the first time in the color conversion data-generating process of FIG. 2. Hence, the target usage U is the amount of colorants used when printing a reference image by using the color conversion data 138 configured based on unmodified target colorimetric values to convert colors in the reference image data 139. The vertical axis represents the coefficient kc described above that is used for calculating the amount of increase in the lightness L*. The second embodiment differs from the first embodiment only in that the coefficient kc is varied based on the target usage U. The processes in FIGS. 2 and 4 are identical to those described in the first embodiment, and the structure of the multifunction peripheral 1000 used in the second embodiment is identical to that shown in FIG. 1.

In S190 of FIG. 2 (the process of FIG. 4) according to the second embodiment, the modifying unit 210 modifies the lightness L* using the coefficient kc determined according to the graph in FIG. 11. As described above, the amount that the lightness L* is increased is larger when the coefficient kc is larger. Therefore, the vertical axis in the graph of FIG. 11 may be said to indicate the amount of increase in the lightness L*. As shown in the graph, the coefficient kc (and hence, the amount of increase in the lightness L*) grows larger as the target usage U grows larger once the target usage U becomes greater than an upper limit Uu of the target usage range. For example, the modifying unit 210 uses a first value kc1 as the coefficient kc when the target usage U is a first usage U1 greater than the upper limit Uu and uses a second value kc2 greater than the first value kc1 as the coefficient kc when the target usage U is a second usage U2 greater than the first usage U1. Thus, when focusing on a single target colorimetric value, the amount of increase in the lightness L* for that colorimetric value is a first value determined based on the first value kc1 when the target usage U is the first usage U1 and is a second value determined based on the second value kc2 (where the second value is greater than the first value) when the target usage U is the second usage U2. The coefficients kc2 and kc1 serve as examples of a first magnitude and a second magnitude, respectively.

In this way, the modifying unit 210 increases the lightness L* of a target colorimetric value more in the second case, i.e., when the target usage U is the second usage U2 (U2>U1) than in the first case in which the target usage U is the first usage U1. This comparison of increases in lightness L* between the first case and second case is performed for each target colorimetric value. Thus, the target colorimetric value can be modified to a brighter color value when the target usage U is relatively large than when the target usage U is relatively small, greatly reducing the amount of colorants used. As a result, this method can suitably suppress the usage of colorants.

If the modifying unit 210 determines again in S170 and S180, after previously modifying the target colorimetric values in S190, that the total usage of colorants is greater than the upper limit of the target usage range, in S190 the modifying unit 210 modifies the target colorimetric values to even larger values, as described in the first embodiment.

The present invention is not limited to use of the correlations shown in FIG. 11, but may employ any of various correlations between the target usage U and the coefficient kc. For example, the coefficient kc may be changed in steps in response to changes in the target usage U. In general, any relationship between the target usage U and coefficient kc may be employed when focusing on a single target colorimetric value, provided that the second increase in the lightness L* employed when the target usage U is the second usage U2 is greater than the first increase in the lightness L* employed when the target usage U is the first usage U1 (U1<U2).

Note that any of various methods may be employed to modify the lightness L* in place of the method using the equation <increase=kc*dL>. Further, the method of controlling the amount of increase in the lightness L* is not limited to a method that controls the coefficient kc, but may be any method appropriate for modifying the lightness L*. For example, the modifying unit 210 may determine the amount of increase in the lightness L* by referencing predetermined correlations between target colorimetric values and increase amounts (using a look-up table, for example). Further, a plurality of different correlations between target colorimetric values and amounts of increase may be respectively associated with differing target usages U. In this case, the modifying unit 210 references the correlation associated with the target usage U to determine the increase in the lightness L*.

C. Variations of the Embodiments (1) In the embodiments described above, the color value having maximum chroma (i.e., the maximum chroma target colorimetric value) used for modifying the lightness L* of a current color value (i.e., the current target colorimetric value) is a target colorimetric value having the same hue as the current color value, but the modifying unit 210 may instead select a target colorimetric value from a plurality of such values having different hues than the current color value. For example, the entire range of hues may be divided into M predetermined partial hue ranges (where M is an integer of 2 or greater), and the modifying unit 210 may select the maximum chroma color value in each partial hue range. For a dark color range having colors darker than the maximum chroma color value within a target color range that includes at least a part of hue ranges (hereinafter called the "current color range"), the modifying unit 210 preferably does not increase the lightness L* within a first color range that includes the outer layer, but increases the lightness L* of target colorimetric values within a second color range constituting at least part of the region inside the first color range. Here, the lightness L* of target colorimetric values in the second color range is higher than the lightness L* of target colorimetric values included in the first color range for color points having the approximate same hue and the approximate same chroma. Further, the maximum lightness within the dark color range may be darker than the lightness of the maximum chroma color value. Further, the uniform hue range described with reference to FIGS. 5, 7, and 8 corresponds to the current color range obtained by setting the width of the partial hue range to zero.

Here, a color range that includes target colorimetric values separated from the outer layer may be used in addition to target colorimetric values on the outer layer as the first color range including the outer layer. In this case, the target colorimetric values within the first color range separated from the outer layer, as well as the target colorimetric values on the outer layer, are not modified. Further, the first condition C1 described above (S205 of FIG. 4) is expanded to include current color values that fall in the first color range.

Figure 12:
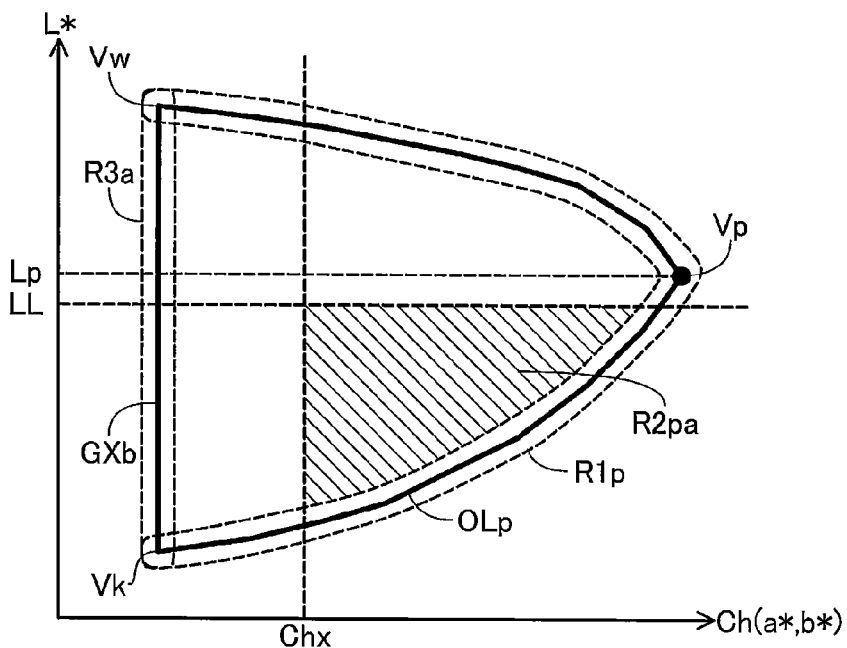
FIG. 12 is an explanatory diagram showing a variation of a second color range on one uniform hue plane in the specified color space.

Further, the second color range whose target colorimetric values have their lightness L* modified is not limited to the color ranges depicted in FIGS. 5, 7, and 8, but may be any of various color ranges that include at least part of the dark color range that is disposed inside of the first color range and that has darker colors than the maximum chroma color value, in the current color range described above. FIG. 12 is an explanatory diagram showing a variation of the second color range. The uniform hue plane in FIG. 12 is the same plane depicted in FIG. 5. FIG. 12 depicts a predetermined chroma threshold Chx that is greater than zero. In the example of FIG. 12, a second color range R2pa denotes the region of the uniform hue plane inside the first color range R1p having an lightness L* no greater than the modification upper limit LL and a chroma Ch greater than or equal to the chroma threshold Chx (excluding the gray range R3a). By eliminating a range of colors with low chroma Ch from the subject of lightness L* modification in this way, this method suppresses the usage of colorants while suitably retaining colors of an image rendered primarily using achromatic colors (a monotone image, for example).

(2) The condition for performing the process to modify target colorimetric values (S190 of FIG. 2; hereinafter called the "modification condition") is not limited to the condition that the target usage U be greater than the upper limit of the target usage range, but may be any condition indicating that usage of colorants should be suppressed. For example, a user command inputted on the data-processing apparatus 100 for reducing the amount of colorants used (hereinafter called an "economizing command") may be used as the modification condition. The modifying unit 210 would then modify some of the plurality of target colorimetric values in response to the user's economizing command. Further, the modification condition may be any type of condition and not just a condition for reducing usage of colorants. For example, a command inputted by the user on the data-processing apparatus 100 for modifying some of the plurality of target colorimetric values (hereinafter called a "modification command") may serve as the modification condition. In this case, the modifying unit 210 may modify some of the plurality of target colorimetric values in response to the user's modification command.

(3) In the embodiments, the condition for modifying a current color value (current target colorimetric value) is met when none of the three conditions C1, C2, and C3 is satisfied. However, the condition for modifying the current color value may be met when only the first condition C1 is not satisfied, for example, or one or both of the second condition C2 and third condition C3 may be omitted from consideration.

(4) The first color space is not limited to the RGB color space, but may be any of various color spaces, such as the YCbCr color space. Similarly, the specific color space representing colorimetric values is not limited to the L*a*b* color space, but may be any of various color spaces, such as the CIE XYZ color space. In general, it is preferable to use a device-independent color space as the specific color space. Further, the colorants used for printing may be of any type and number and are not limited to the combination of CMYK colors. In any case, color spaces respectively representing all colorants used for printing as color components may be employed as the second color spaces for representing the usage amounts of colorants.

(5) The color conversion data 138 is not limited to a look-up table, but may be any form of data that specifies correlations between input color values and output color values. For example, a function that takes an input color value as its argument may be employed as the color conversion data 138. This also applies to the data 135a, 135b, 136, and 137 expressing other correlations.

(6) Various other procedures may be used to generate the color conversion data 138, and the present invention is not limited to the procedure described with reference to FIGS. 2 and 4. For example, the upper limit of the output color values may be fixed. In this case, steps S100, S110, and S180 may be omitted from FIG. 2 and, hence, the modifying unit 210 may advance directly to step S190 upon reaching a NO determination in S170. Further, in the uniform hue plane shown in FIG. 7, the modifying unit 210 may be configured not to modify the target colorimetric values that are brighter than the lightness Lq of the maximum chroma color point and to modify the target colorimetric values that are darker than the lightness Lq of the maximum chroma color point, regardless of whether the chroma Ch of the target colorimetric value is greater than the chroma threshold Cht. In this case, step S240 may be omitted from FIG. 4 and, hence, the modifying unit 210 may advance directly to step S260 upon reaching a NO determination in S230.

(7) The data-processing apparatus that executes the process for generating color conversion data in FIG. 2 may have various other configurations and is not limited to the configuration in FIG. 1. For example, one or both of the display unit 140 and operating unit 150 may be eliminated. Further, a data-processing apparatus incorporated in a type of device different from the multifunction peripheral 1000, such as a personal computer, printer, or mobile telephone, may execute the process for generating color conversion data. Further, a plurality of devices that can communicate over a network (computers, for example) may each perform a portion of the process for generating color conversion data so that the devices as a whole can provide the functions required for implementing the process. Here, the system comprising the devices serves as an example of a data-processing apparatus.

Part of the configuration implemented in hardware in the embodiments described above may be replaced with software and, conversely, all or part of the configuration implemented in software in the embodiments may be replaced with hardware. For example, the functions of the generating unit 220 in FIG. 1 may be implemented by dedicated hardware configured of logic circuits.

When all or some of the functions of the present invention are implemented with computer programs, the programs can be stored on a computer-readable storage medium (a non-temporary storage medium, for example). The programs may be used on the same storage medium on which they were supplied, or may be transferred to a different storage medium (computer-readable storage medium). The "computer-readable storage medium" may be a portable storage medium, such as a memory card or CD-ROM; an internal storage device built into the computer, such as any of various ROM or the like; or an external storage device, such as a hard disk drive, connected to the computer.

While the invention has been described in detail with reference to the embodiments thereof, it would be apparent to those skilled in the art that various changes and modifications may be made therein without departing from the spirit of the invention.

What is claimed is:

1. A data-processing apparatus comprising a storage device and a controller, the controller being configured to perform:
   obtaining, from the storage device, a plurality of measurement values defined in a specified color space, the plurality of measurement values being in one-to-one correspondence with a plurality of color values that are defined in a first color space, the plurality of measurement values defining a color range in which the plurality of measurement values are distributed in the specified color space, the color range having an outer layer and including a target color range corresponding to at least a part of a plurality of hue ranges defined in the specified color space, the target color range including a dark color range that is defined by lightness of a maximum chroma measurement value having a maximum chroma among measurement values included in the target color range, a measurement value in the dark color range having lightness value smaller than the lightness of the maximum chroma measurement value, the dark color range including a first color range and a second color range, the first color range including at least a part of the outer layer corresponding to the target color range, the second color range being at least a part of a portion inside the first color range;
   modifying a part of the plurality of measurement values obtained from the storage device to acquire modified measurement values, the modifying being performed to meet the following conditions (a) and (b):
      (a) lightness of each measurement value within the first color range is not increased; and
      (b) lightness of each measurement value within the second color range is increased;
   storing the modified measurement values in the storage device;
   obtaining the modified measurement values from the storage device; and
   generating color conversion data representing correlations between color values defined in the first color space and color values defined in a second color space by using the modified measurement values obtained from the storage device, each color value that is defined in the second color space representing an amount of colorant used for printing;
   wherein the second color range includes a first part adjacent to the first color range and a second part separated from the first color range,
   wherein the modifying is performed to meet a condition that a first ratio is greater than a second ratio, the first ratio being a ratio of change in lightness in the specified color space determined based on the modified measurement values that correspond to the first part to change in lightness in the first color space determined based on measurement values that have not yet been modified and that correspond to the first part, the second ratio being a ratio of change in lightness in the specified color space determined based on the modified measurement values that correspond to the second part to change in lightness in the first color space determined based on measurement values that have not yet been modified and that correspond to the second part.

2. The data-processing apparatus according to claim 1, wherein the controller is further configured to perform determining whether or not the amount of colorant used for printing should be reduced,
   wherein the modifying is performed when the amount of colorant used for printing is determined to be reduced.

3. The data-processing apparatus according to claim 1, wherein measurement values within the second color range includes a first measurement value and a second measurement value having lightness darker than lightness of the first measurement value;
   wherein the modifying includes:
      modifying the first measurement value using a first increase in lightness;
      modifying the second measurement value using a second increase in lightness, the second increase being greater than the first increase.

4. The data-processing apparatus according to claim 1, wherein the controller is further configured to perform determining a usage amount, the usage amount being an amount of colorant used for printing an image by performing a color space conversion on a specified image data using reference color conversion data, the reference color conversion data being determined by the plurality of measurement values that have not yet been modified,
   the modifying is performed to further meet a condition that a first magnitude is greater than a second magnitude, the first magnitude being a magnitude of increase in lightness between before and after the modifying is performed if the usage amount is a first usage amount, the second magnitude being a magnitude of increase in lightness between before and after the modifying is performed if the usage amount is a second usage amount smaller than the first usage amount.

5. The data-processing apparatus according to claim 1, wherein, if the portion inside the first color range includes a specified color range and the second color range, the modifying is performed to further meet a condition that lightness of each measurement value within the specified color range is not increased.

6. The data-processing apparatus according to claim 1, wherein the controller is further configured to perform determining whether or not chroma of a measurement value within the target color range is greater than a chroma threshold;
wherein the modifying is performed to increase lightness of a measurement value within the target color range, if one of the following conditions (c) and (d) is met:
(c) chroma of the measurement value is greater than the chroma threshold and the lightness of the measurement value is smaller than or equal to a first lightness; and
(d) chroma of the measurement value is smaller than or equal to the chroma threshold and the lightness of the measurement value is smaller than or equal to a second lightness, the second lightness being smaller than or equal to the first lightness.

7. A non-transitory computer readable storage medium storing a set of program instructions executed by a computer, the computer comprising a storage device and a controller, the controller being configured to perform the program instructions, the program instructions comprising:
obtaining, from the storage device, a plurality of measurement values defined in a specified color space, the plurality of measurement values being in one-to-one correspondence with a plurality of color values that are defined in a first color space, the plurality of measurement values defining a color range in which the plurality of measurement values are distributed in the specified color space, the color range having an outer layer and including a target color range corresponding to at least a part of a plurality of hue ranges defined in the specified color space, the target color range including a dark color range that is defined by lightness of a maximum chroma measurement value having a maximum chroma among measurement values included in the target color range, a measurement value in the dark color range having lightness value smaller than the lightness of the maximum chroma measurement value, the dark color range including a first color range and a second color range, the first color range including at least a part of the outer layer corresponding to the target color range, the second color range being at least a part of a portion inside the first color range;
modifying a part of the plurality of measurement values obtained from the storage device to acquire modified measurement values, the modifying being performed to meet the following conditions (a) and (b):
(a) lightness of each measurement value within the first color range is not increased; and
(b) lightness of each measurement value within the second color range is increased;
storing the modified measurement values in the storage device;
obtaining the modified measurement values from the storage device; and
generating color conversion data representing correlations between color values defined in the first color space and color values defined in a second color space by using the modified measurement values obtained from the storage device, each color value that is defined in the second color space representing an amount of colorant used for printing;
wherein the second color range includes a first part adjacent to the first color range and a second part separated from the first color range,
wherein the modifying is performed to meet a condition that a first ratio is greater than a second ratio, the first ratio being a ratio of change in lightness in the specified color space determined based on the modified measurement values that correspond to the first part to change in lightness in the first color space determined based on measurement values that have not yet been modified and that correspond to the first part, the second ratio being a ratio of change in lightness in the specified color space determined based on the modified measurement values that correspond to the second part to change in lightness in the first color space determined based on measurement values that have not yet been modified and that correspond to the second part.

8. A data-processing apparatus comprising a storage device and a controller, the controller being configured to perform:
obtaining, from the storage device, a plurality of measurement values defined in a specified color space, the plurality of measurement values being in one-to-one correspondence with a plurality of color values that are defined in a first color space, the plurality of measurement values defining a color range in which the plurality of measurement values are distributed in the specified color space, the color range having an outer layer and including a target color range corresponding to at least a part of a plurality of hue ranges defined in the specified color space, the target color range including a dark color range that is defined by lightness of a maximum chroma measurement value having a maximum chroma among measurement values included in the target color range, a measurement value in the dark color range having lightness value smaller than the lightness of the maximum chroma measurement value, the dark color range including a first color range and a second color range, the first color range including at least a part of the outer layer corresponding to the target color range, the second color range being at least a part of a portion inside the first color range;
modifying a part of the plurality of measurement values obtained from the storage device to acquire modified measurement values, the modifying being performed to meet the following conditions (a) and (b):
(a) lightness of each measurement value within the first color range is not increased; and
(b) lightness of each measurement value within the second color range is increased;
storing the modified measurement values in the storage device;
obtaining the modified measurement values from the storage device; and
generating color conversion data representing correlations between color values defined in the first color space and color values defined in a second color space by using the modified measurement values obtained from the storage device, each color value that is defined in the second color space representing an amount of colorant used for printing;
wherein the controller is further configured to perform determining a usage amount, the usage amount being an amount of colorant used for printing an image by performing a color space conversion on a specified image data using reference color conversion data, the reference color conversion data being determined by the plurality of measurement values that have not yet been modified,
the modifying is performed to further meet a condition that a first magnitude is greater than a second magnitude, the first magnitude being a magnitude of increase in lightness between before and after the modifying is performed if the usage amount is a first usage amount, the second magnitude being a magnitude of increase in lightness between before and after the modifying is performed if the usage amount is a second usage amount smaller than the first usage amount.

9. The data-processing apparatus according to claim 8, wherein the controller is further configured to perform determining whether or not the amount of colorant used for printing should be reduced,
   wherein the modifying is performed when the amount of colorant used for printing is determined to be reduced.

10. The data-processing apparatus according to claim 8, wherein measurement values within the second color range includes a first measurement value and a second measurement value having lightness darker than lightness of the first measurement value;
   wherein the modifying includes:
      modifying the first measurement value using a first increase in lightness;
      modifying the second measurement value using a second increase in lightness, the second increase being greater than the first increase.

11. The data-processing apparatus according to claim 8, wherein, if the portion inside the first color range includes a specified color range and the second color range, the modifying is performed to further meet a condition that lightness of each measurement value within the specified color range is not increased.

12. The data-processing apparatus according to claim 8, wherein the controller is further configured to perform determining whether or not chroma of a measurement value within the target color range is greater than a chroma threshold;
   wherein the modifying is performed to increase lightness of a measurement value within the target color range, if one of the following conditions (c) and (d) is met:
      (c) chroma of the measurement value is greater than the chroma threshold and the lightness of the measurement value is smaller than or equal to a first lightness; and
      (d) chroma of the measurement value is smaller than or equal to the chroma threshold and the lightness of the measurement value is smaller than or equal to a second lightness, the second lightness being smaller than or equal to the first lightness.

13. A non-transitory computer readable storage medium storing a set of program instructions executed by a computer, the computer comprising a storage device and a controller, the controller being configured to perform the program instructions, the program instructions comprising:
   obtaining, from the storage device, a plurality of measurement values defined in a specified color space, the plurality of measurement values being in one-to-one correspondence with a plurality of color values that are defined in a first color space, the plurality of measurement values defining a color range in which the plurality of measurement values are distributed in the specified color space, the color range having an outer layer and including a target color range corresponding to at least a part of a plurality of hue ranges defined in the specified color space, the target color range including a dark color range that is defined by lightness of a maximum chroma measurement value having a maximum chroma among measurement values included in the target color range, a measurement value in the dark color range having lightness value smaller than the lightness of the maximum chroma measurement value, the dark color range including a first color range and a second color range, the first color range including at least a part of the outer layer corresponding to the target color range, the second color range being at least a part of a portion inside the first color range;
   modifying a part of the plurality of measurement values obtained from the storage device to acquire modified measurement values, the modifying being performed to meet the following conditions (a) and (b):
      (a) lightness of each measurement value within the first color range is not increased; and
      (b) lightness of each measurement value within the second color range is increased;
   storing the modified measurement values in the storage device;
   obtaining the modified measurement values from the storage device; and
   generating color conversion data representing correlations between color values defined in the first color space and color values defined in a second color space by using the modified measurement values obtained from the storage device, each color value that is defined in the second color space representing an amount of colorant used for printing;
   wherein the controller is further configured to perform determining a usage amount, the usage amount being an amount of colorant used for printing an image by performing a color space conversion on a specified image data using reference color conversion data, the reference color conversion data being determined by the plurality of measurement values that have not yet been modified,
   the modifying is performed to further meet a condition that a first magnitude is greater than a second magnitude, the first magnitude being a magnitude of increase in lightness between before and after the modifying is performed if the usage amount is a first usage amount, the second magnitude being a magnitude of increase in lightness between before and after the modifying is performed if the usage amount is a second usage amount smaller than the first usage amount.

* * * * *